United States Patent [19]

Salee

[11] 4,304,709

[45] Dec. 8, 1981

[54] POLYMER BLENDS WITH IMPROVED HYDROLYTIC STABILITY

[75] Inventor: Gideon Salee, Williamsville, N.Y.

[73] Assignee: Hooker Chemicals & Plastics Corp., Niagara Falls, N.Y.

[21] Appl. No.: 221,743

[22] Filed: Dec. 31, 1980

Related U.S. Application Data

[63] Continuation-in-part of Ser. No. 90,178, Nov. 1, 1979, abandoned.

[51] Int. Cl.³ .................... C08L 67/02; C08L 54/04
[52] U.S. Cl. .................... 260/40 R; 260/42.18; 260/42.15; 525/64; 525/68
[58] Field of Search .................. 525/64, 68; 260/40 R

[56] References Cited

U.S. PATENT DOCUMENTS

| | | | |
|---|---|---|---|
| 3,290,165 | 12/1966 | Iannicelli | 260/40 R |
| 3,758,640 | 9/1973 | Thorpe | 525/64 |
| 3,919,353 | 11/1975 | Castenuovo et al. | 260/873 |
| 4,022,748 | 5/1977 | Schlichting et al. | 525/64 |
| 4,097,446 | 6/1978 | Abolins et al. | 525/64 |
| 4,117,034 | 9/1978 | Steffancin | 525/64 |

*Primary Examiner*—Carman J. Seccuro
*Attorney, Agent, or Firm*—James F. Mudd; David A. Stein

[57] ABSTRACT

This invention relates to polymer blends having improved hydrolytic stability which comprise, in admixture, (1) a linear aromatic polyester of monomer residues consisting essentially of residues of a dicarboxylic acid and a bisphenol, and (2) an MBS polymer.

25 Claims, No Drawings

POLYMER BLENDS WITH IMPROVED HYDROLYTIC STABILITY

CROSS-REFERENCE TO RELATED APPLICATION

This application is a continuation-in-part of copending U.S. application Ser. No. 90,178, filed Nov. 1, 1979, now abandoned.

BACKGROUND OF THE INVENTION

This invention relates to blends of an MBS polymer and a linear aromatic carboxylic polyester of monomer components consisting essentially of a bisphenol and a dicarboxylic acid wherein the dicarboxylic acid can be an aromatic dicarboxylic acid or an aliphatic saturated dicarboxylic acid such as oxalic or adipic acids.

Linear aromatic polyesters prepared from aromatic dicarboxylic acids and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

In order to form a successful molding resin on a commercial scale, a polymer should be capable of being molded conveniently without significant degradation in physical properties. In this respect, although the aforementioned aromatic polyesters generally display excellent physical and chemical properties, a persistent and troublesome problem has been their sensitivity to hydrolytic degradation at elevated temperatures. This is demonstrated by the loss of tensile strength which can occur when an aromatic polyester resin is molded and subsequently immersed in boiling water. This tendency may be explained, in part, by the hydrolysis of the ester linkages under these conditions. In any event, it is to be appreciated that sensitivity to moisture represents a significant problem in aromatic polyester resins that would significantly limit their commercial utility in appications such as in autoclaves or at elevated temperatures in humid atmospheres.

Accordingly, it is a principal object of this invention to prepare aromatic polyester compositions having superior physical and chemical properties as well as improved hydrolytic stability.

SUMMARY OF THE INVENTION

It has now been found that thermoplastic polyester molding compositions having improved hydrolytic stability may be prepared by blending a linear aromatic polyester consisting essentially of bisphenol and dicarboxylic acid monomer components with an MBS polymer additive, i.e. a polymer or polymer composition consisting essentially of methyl methacrylate, 1,3-butadiene and styrene monomer components. The preferred aromatic polyesters of this invention consist essentially of a bispenol component and at least one aromatic dicarboxylic acid component, most preferably selected from the group consisting of isophthalic acid, terephthalic acid, or mixtures thereof.

DESCRIPTION OF THE PREFERRED EMBODIMENTS

The linear aromatic polyesters of the present invention can conveniently be prepared by condensing a diacid halide, e.g. a diacid bromide or especially a diacid chloride of a dicarboxylic acid, dissolved in an organic liquid which is a solvent for the polyester to be formed, with a metal phenolate of a bisphenol, dissolved in a liquid which is immiscible with the solvent for the diacid halide. This interfacial polymerization process is more fully described in U.S. Pat. No. 3,216,970, to Conix, the disclosure of which is incorporated herein by reference. The foregoing interfacial polymerization method is a modification of the solution polyesterification process which can also be employed in the preparation of suitable aromatic polyesters from the aforementioned diacid halide and the bisphenol. Such solution preparatory procedures are disclosed in P. W. Morgan "Condensation Polymers by Interfacial and Solution Methods", Interscience Publishers, 1965, Chapter VIII, particularly pages 332-364, the disclosure of which is incorporated herein by reference.

The bisphenols which can be used in this process are known in the art and correspond to the general formula:

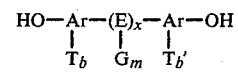

wherein Ar is aromatic, preferably containing 6-18 carbon atoms (including phenyl, biphenyl and naphthyl); G is alkyl, haloalkyl, aryl, haloaryl, alkylaryl, haloalkylaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, $-O-$, $-S-$, $-SO-$, $-SO_2-$, $-SO_3-$,

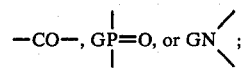

T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bisphenol-A; i.e. bis(4-hydroxyphenyl)-2,2-propane, bis(3-hydroxyphenyl)-1,2-ethane, bis(4-hydroxyphenyl)-1,2-ethane as well as the other bisphenols illustrated in G. Salee, U.S. Pat. No. 4,126,602 (issued Nov. 21, 1978) at column 2, line 68—column 3, line 47, the disclosure of said patent being incorporated herein reference. Representative biphenols include p,p'-biphenol, and the other bi-phenols illustrated in the aforementioned U.S. Pat. No. 4,126,602, at column 3, lines 47–55. Mixtures of isomers of the foregoing bisphenols and biphenols can be used. Preferably, the bisphenol component, i.e. the bisphenol monomer residue, of the present polyester is derived from bisphenol-A.

The dicarboxylic acids which are useful in this process are also well known and can be represented by the formula:

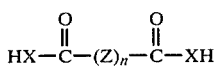

in which X is oxygen or sulfur, Z is alkylene, —Ar— or —Ar—Y—Ar— where Ar has the same definition as given with respect to the bisphenol, Y is an alkylene of 1 to 10 carbons, haloalkylene,

—O—, —S—, —SO—, —SO$_2$—, —SO$_3$—,

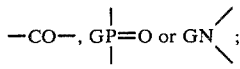

and n is 0 or 1.

Suitable dicarboxylic acids include aromatic dicarboxylic acids such as isophthalic acid and terephthalic acid, as well as the other aromatic dicarboxylic acids illustrated in the aforementioned U.S. Pat. No. 4,126,602 at column 4, lines 5–17.

Suitable aliphatic acids include oxalic acid, malonic acid, dithiomethonic acid and the other aliphatic dicarboxylic acids illustrated in the aforementioned U.S. Pat. No. 4,126,602 at column 4, lines 17–19. Aromatic acids are preferred. Of the aromatic dicarboxylic acids, isophthalic acid and terephthalic acid are especially preferred due to their availability and low cost. Most preferably, the dicarboxylic acid component comprises a mixture of about 75 to about 100 mol percent isophthalic acid and about 25 to about 0 mol percent terephthalic acid.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

The polyester component of the invention are preferably prepared by a transesterification polymerization which is generally carried out in the melt, i.e. without use of a reaction diluent. Such transesterification polymerization reactions involve an ester interchange reaction between (1) a di-lower alkanoyl ester of the bisphenol (for example a diester of a bisphenol and a lower, i.e. $C_1$–$C_6$ alkanoic acid such as acetic acid) and the dicarboxylic acid; (2) said di-lower alkanoyl ester of the bisphenol and a di-lower alkyl ester of the dicarboxylic acid, e.g. a dimethyl ester of said dicarboxylic acid; and (3) the bisphenol and a diaryl ester of the dicarboxylic acid wherein said ester is the diester of the dicarboxylic acid and a monohydroxy aromatic compound of the benzene or naphthalene series of 6–20 carbon atoms such as phenol (as described in U.S. application Ser. No. 45,464 of J. C. Rosenfeld, filed June 4, 1979, the disclosure of which is incorporated herein by reference). The aforementioned transesterification reaction routes for preparation of the present polyester are more particularly described in T. Maruyama et al., U.S. Pat. No. 4,075,173, issued Feb. 21, 1978, the disclosure of which is incorporated herein by reference.

It is especially preferred to employ in the invention, polyesters prepared by transesterification reaction of the bisphenol and a diaryl ester of the dicarboxylic acid, i.e. prepared by transesterification reaction route (3) above. Preparation of the polyester by the latter especially preferred transesterification reaction is more particularly described in British Patent 924,607, published Apr. 24, 1963, (to Imperial Chemical Industries Ltd.); K. Eise et al, German Preliminary Application No. 22 32 877, published Jan. 17, 1974; G. Bier, Polymer 15 527–535 (1974); G. M. Kosanovich and G. Salee, U.S. patent applications Ser. No. 128,742, filed Mar. 10, 1980 and Ser. No. 198,979, filed Oct. 21, 1980; J. C. Rosenfeld, U.S. application Ser. No. 128,743, filed Mar. 10, 1980; and J. A. Pawlak, J. C. Rosenfeld and G. Salee, U.S. patent application Ser. No. 198,980, filed Oct. 21, 1980, the disclosures of the foregoing patent article and applications being incorporated herein by reference.

THE METHYL METHACRYLATE-1,3-BUTADIENE-STYRENE POLYMER (MBS POLYMER) COMPONENT

The MBS polymers, i.e. polymers comprising methyl methacrylate, 1,3-butadiene and styrene, employed as components of the compositions of the invention constitute a readily available class of polymers (generally proprietary polymers) which are widely employed as impact-enhancing modifiers for polyvinyl halide resins. The MBS polymers as manufactured for use as polyvinyl halide impact modification agents are generally graft polymers prepared by polymerizing methyl methacrylate (and optionally in minor proportion to the methacrylate monomer ethylenically unsaturated comonomers copolymerizable therewith such as acrylonitrile or styrene) in the presence of a polybutadiene or a polybutadiene-styrene trunk copolymer rubber, as described in L. I. Nass Ed. "Encyclopedia of PVC", M. Dekker, Inc., Vol. 2, 1977, page 613, Section 2(a), the disclosure of which is incorporated herein by reference. It is well understood that a wide variety of grafting conditions and choice of comonomers can be employed in the preparation of the MBS polymer. Alternatively, the MBS polymer may be a blend of a methyl methacrylate-styrene copolymer, for example, a terpolymer of methyl methacrylate, styrene and acrylonitrile, in minor amount, with either polybutadiene or a copolymer of butadiene and minor proportions of such comonomers as for example, styrene and acrylonitrile as disclosed by R. E. Gallagher, U.S. Pat. No. 3,933,393, the disclosure of which is incorporated herein by reference.

Preferably, the MBS polymer component consists essentially of methyl methacrylate, 1,3-butadiene and styrene monomer components. Typical graft polymerization sequences and/or comonomers for use with the methacrylate monomer in preparaion of the MBS polymer modifiers are disclosed in the following U.S. Pat. Nos.: 3,670,052; 3,651,177; 3,287,443; 2,943,074; 2,018,268; 3,444,269; 3,445,416; 3,652,483; 3,652,727; 3,657,390; 3,717,688; 3,775,514; 3,780,134; 3,842,144; 3,907,928; 3,922,320; 4,021,509; 4,041,106; as well as German Offenlegungschrift of S. Koyanigi et al. No. 2,064,297, the disclosures of which are incorporated herein by reference.

Proprietary MBS polymers include Blendex 436 (manufactured by Borg-Warner Co.), an MBS polymer modified with residues of acrylonitrile, as well as Acryloid KM299, KM607-N and KM611 of Rohm and Haas Co. (described in R. P. Petrich, Polymer Eng. and Sci., July 1978, Vol. 13, No. 4, pages 248–258 and in J. T. Lutz, Jr., Adv. In Chem. Ser. No. 134, 1974, pages 61–72, the disclosures of which are incorporated herein by reference) as well as Kane Ace B-12 and B-22 manufactured by Kanegafuchi Chemical Industry Co., the latter proprietary MBS polymer being prepared in accordance with the technology of the above-mentioned U.S. Pat. Nos. 3,387,443; 3,651,177 and 3,670,052 of K. Saito et al.

Most preferably, the polymeric additive employed in the present polyester-MBS polyer compositions consists essentially of an MBS polymer, i.e. the present polyester-MBS polymer blend composition is preferably a binary mixture of the MBS polymer and the polyester.

The novel resin compositions of the instant invention are prepared by blending the linear aromatic polyester with the MBS polymer in substantially molten condition. The blending or mixing process can be performed using conventional mixing equipment such as, for example, a Banbury mixer, mixing roll, kneader, screw extruder, or injection molding machine.

Although the mixing ratio may vary depending on the physical properties desired in the resultant polymer blend, the MBS polymer is generally present in a proportion of about 1 to about 99 weight percent based on the weight of the admixture of the polyester and the MBS polymer.

The MBS polymer component is preferably present in a minor proportion, i.e. less than about 50% by weight, of the combined weight of the polyester and MBS resins, typically in an amount of about 2 parts to less than about 50 parts by weight per 100 weight parts of blended resin admixture. An especially good result is obtained employing the MBS polymer additive in a proportion of about 5 parts to about 30 parts per 100 parts by weight of polyblend admixture.

The novel polymer compositions of the present invention may also include various additives such as organic or inorganic fillers, stabilizers, antistatic agents, and flame retardants.

The halogen-containing flame retardant agents of U.S. application Ser. No. 863,556 of G. Salee, filed Dec. 22, 1977, issued on July 8, 1980 as U.S. Pat. No. 4,211,687, and of co-pending U.S. application Ser. No. 863,381 of G. Salee, also filed Dec. 22, 1977, can be employed in the present compositions. The disclosures of these applications are incorporated herein by reference.

The additive-containing resin mixture of the invention may be prepared, if desired, by charging the polyester and MBS polymer with the additive to a conventional mixing apparatus, such as a premix mixer, or melt extruder. The resultant additive-containing composition can then be molded directly in an injection molding apparatus of an extruder. The molded articles thus formed have excellent hydrolytic stability and tensile strength.

The fillers which may be employed in the invention are preferably particulate fillers such as particulate glass (e.g. chopped glass fiber, glass rovings, glass microballons or microspheres and pulverulent glass), particulate clay, talc, mica, inorganic natural fibers, synthetic organic fibers, alumina, graphite, silica, calcium carbonate, carbon black, magnesia and the like. Generally, such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally, the amount of particulate filler employed in the compositions of the invention is in the range of about 5 to about 70 weight percent, preferably about 5 to about 40 weight percent, and especially about 8 to about 30 weight percent based on the combined weight of the polyester and the MBS polymer additive. The filler employed is preferably inorganic.

According to the invention, use of a particulate glass filler, advantageously glass fibers, is especially desirable.

The glass filler, especially glass fiber filler, employed in the invention preferably contains an organic coupling agent as a very thin coating on the glass particles. The coupling agent forms an adhesive bridge between the glass and the polymer blend thereby enhancing the strength properties of the filled polymer blend. Typically, organic coupling agents employed in the art include transition metal complexes of unsaturated aliphatic acids such as the methacrylato chromic chloride complex as well as various organic silane compounds including vinyl trichlorosilane, as well as the other exemplified silane coupling agents listed in copending U.S. patent application of G. Salee, Ser. No. 905,623, filed May 12, 1978, now abandoned, copending continuation thereof filed May 28, 1980, as U.S. application Ser. No. 154,174, the disclosure of which is incorporated herein by reference.

Preferably, the coupling agent employed with the glass filler according to the invention is a silane coupling agent.

Glass fillers are frequently manufactured and sold so as to contain the coupling agent as a proprietary ingredient on the surface of the glass. The coupling agents and their use with glass fillers are discussed in more detail in W. V. Titow and B. J. Lanham, "Reinforced Thermoplastics", Halstead Press, 1975, pages 83–88 and L. Mascia, "The Role of Additives in Plastics", J. Wiley and Sons, 1974, pages 89–91, the disclosures of which references are incorporated herein by reference.

The present blends have utility as engineering thermoplastics in manufacture of automotive parts as well as housings and casings of electrically operated apparatus such as radios and power tools, for example, drills and saws. On account of the enhanced hydrolytic stability of the present blends, the present compositions are also useful for manufacture of household wares designed for exposure to moisture at elevated temperatures such as dishes, particularly oven ware, and the handles and covers of coffee and tea pots.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1 (Control)

A bisphenol—A—isophthalate—terephthalate polyester is prepared by reaction of the bisphenol with diacid halides of isophthalic acid and terephthalic acid as follows:

A mixture of 21,636 grams (94.74 moles) of bisphenol-A, 16,565 grams (81.60 moles) of isophthaloyl chloride, 20,924 grams (14.4 moles) of terephthaloyl chloride, 380 grams (2.153 moles) of paratertiary butyl phenol, and 515 pounds of methylene chloride solvent are charged under a blanket of dry nitrogen gas to a dry 100 gallon reaction vessel equipped with agitation means. To a 50 gallon addition vessel is charged 20,067 grams (198.31 moles) of triethylamine catalyst. The triethylamine is added gradually at a temperature of 10° to 20° to the agitated reaction mixture from the addition vessel over a period of 3 hours and 25 minutes under a blanket of dry nitrogen.

The 50-gallon addition vessel is then rinsed with 250 pounds of methylene chloride and the methylene chloride rinse is added to the reaction mixture in the polyesterification reaction vessel. Agitation of the reaction mass is continued for 3 hours at about 20°. Then a mixture of 600 ml of concentrated aqueous hydrochloric acid dissolved in 15 gallons of deionized water are stirred into the reaction mixture. The reaction mass is allowed to stratify into an upper aqueous layer and a lower organic layer containing the polyester product. The lower organic layer is withdrawn and then washed free of chloride ion with deionized water.

The resulting organic layer is divided into two equal portions. Isopropyl alcohol (190 pounds) is added to each portion to precipitate the polyester. On completion of the addition methylene chloride solvent is removed by distillation. During the distillation an additional 60 pounds of isopropyl alcohol is added to each portion to insure complete precipitation of the polyester product. The precipitated polyester products are recovered from each isopropyl-alcohol containing distillant portion, combined and dried to obtain an excellent yield of a linear aromatic polyester of bisphenol-A, isophthalic acid and terephthalic acid having a mole ratio of terephthaloyl monomer residues to isophthaloyl monomer residues of about 15:85. The polyester product has an intrinsic viscosity of 0.58 dl/g as determined at a temperature of 30° at a concentration of 0.5% in a symmetrical tetrachloroethane solution of the polyester.

The polyester made by the foregoing solution polymerization preparatory procedure, after being dried at 120° for four hours, is compacted by extrusion from a Haake extruder operating under the following conditions:

| RPM | TEMPERATURE OF | | | | Die Melt | Torque | Amp. |
| --- | --- | --- | --- | --- | --- | --- | --- |
| | Zone 1 | Zone 2 | Zone 3 | Zone 4 | | | |
| 90 | 290° | 290° | 290° | 290° | 310° | 4000–5000m.-g. | 75 |

The compacted extruded polyester strands are chopped into pellets which are dried and injection-molded into specimens suitable for evaluation of properties, e.g. tensile properties, in an Arburg Injection Molding Apparatus Model 220 operating under the following conditions:

| | |
| --- | --- |
| Cylinder Temperature | 620° |
| Mold Temperature | 250° F. |
| Molding Pressure | 17,760 psi |

The heat distortion temperature at 264 psi, i.e. HDT, the Notched Izod impact resistance, the tensile strength and tensile modulus of the molded polyester are measured and these data are presented with the foregoing injection molding conditions in the Table below. Additional specimens of the injection molded polyester are immersed in a bath of boiling water of substantially neutral pH for one week. After being raised from the bath these specimens are tested for tensile modulus and tensile strength which data is also presented in Table I below.

EXAMPLE 2 (Control)

A procedure substantially similar to that of Example 1 is employed to prepare and injection mold a polyester of bisphenol-A, isophthalic acid and terephthalic acid monomer residues containing substantially the same molar ratio of isophthaloyl and terephthaloyl monomer residues as the product of Example 1. The intrinsic viscosity of the polyester product prior to molding is measured as described in Example 1 above is 0.63 dl/g. The polyester properties described in Example 1 above are measured for this product and are also presented in Table I below together with the operating conditions used in injection molding of the polyester. In this Example the tensile properties of the injected polyester are also measured after one- and two-week immersion in boiling water.

EXAMPLE 3

A physical mixture of 240 parts of the dry linear aromatic polyester of Example 1 and 30 parts of a proprietary acrylonitrile modified MBS polymer manufactured by Borg Warner Chemicals under the designation Blendex 436 are blended and compacted, injection-molded and tested for properties substantially as described in Example 1 above. The injection molding conditions and the properties of the resulting polyester-MBS polymer blend which contains about 11% of the MBS polymer based on the combined weight of the polyester are presented in Table I below.

EXAMPLE 4

The procedure of Example 3 is repeated substantially as described above in preparing and injection molding a blend of the polyester of Example 1 and the MBS polymer of Example 3 employing 600 parts of the polyester and 200 parts of the MBS polymer (corresponding to about 25% of the MBS polymer based on the combined The blend of this Example is tested for properties substantially as described in Example 3 and these results are presented with injection molding operating conditions in Table I below.

EXAMPLE 5

The procedure of Example 4 is repeated substantially as described except that in place of the polyester of Example 1 there is employed the polyester of Example 2 and in place of the proprietary MBS polymer additive of Example 4 there is employed an MBS polymer manufactured by the Kanegafuchi Chemical Industry Co., Ltd. under the designation Kane Ace B-22. The results of this Example are also presented in Table I below.

blend in accordance with the invention. The results of this Example are also tabulated in Table I below.

TABLE I

|  | Ex. 1 (Control) | Ex. 2 (Control) | Example 3 | Example 4[a] | Example 5[a] | Example 6[a] | Example 7[a,b] |
|---|---|---|---|---|---|---|---|
| Bisphenol Polyester (Percent) | 100 | 100 | 89% (Polyester of Ex. 1) | 75% (Polyester of Ex. 1) | 75% (Polyester of Ex. 2) | 89% (Polyester of Ex. 2) | 89% (Polyester of Ex. 1) |
| MBS Polymer Additive (Percent) | none | none | 11% (Blendex 436) | 25% (Blendex 436) | 25% (Kane Ace B-22) | 11% (Kane Ace B-22) | 11% (Blendex 436) |
| *Injection Molding Conditions* | | | | | | | |
| Cylinder Temperature °F. | 620° | 630° | 610° | 600° | 580° | 610° | 600° |
| Mold Temperature °F. | 250° | 250° | 250° | 250° | 250° | 250° | 240° |
| Injection Pressure, psi | 17,760 | 18,870 | 15,540 | 14,430 | 17,760 | 19,980 | 12,210 |
| *Properties* | | | | | | | |
| HDT at 264 psi | 162.3° | 164.6° | 154.7° | — | — | — | 163.5° |
| Notched Izod Impact Resistance, ft-lbs/in. | 6.1 | 8.1 | 5.9 | — | — | — | 1.54 |
| *Tensile Properties Prior To Immersion:* | | | | | | | |
| Tensile Strength, psi | 9700 | 10,000 | 8304 | 6232 | 6487 | 8251 | 10,533 |
| Tensile Modulus, psi × 10$^5$ | 3.0 | 3.02 | 2.91 | 2.43 | 2.45 | 2.84 | 4.45 |
| *After 1 Week Immersion in Boiling Water:* | | | | | | | |
| Tensile Strength, psi | 3800 | 8400 | 8716 | 6533 | 7051 | 8883 | — |
| Tensile Modulus, psi × 10$^5$ | 3.27 | 3.25 | 2.67 | 2.41 | 2.51 | 3.01 | — |
| *After 2 Week Immersion in Boiling Water* | | | | | | | |
| Tensile Strength, psi | — | 2000 | 8187 | — | 7226 | 9046 | — |
| Tensile Modulus, psi × 10$^5$ | — | 3.33 | 3.7 | — | 2.56 | 3.04 | — |

NOTES TO TABLE I
[a] The molded product blends of Example 4–7 are also tested percent elongation. The percent elongation (yield) of these products are:
Example 4: 7.1% prior to boiling water immersion, 5.7% after immersion;
Example 5: 6.3%, prior to immersion, 5.4% after one week immersion, 5.1%, after two week immersion,
Example 6: 6.8%, prior to immersion, 5.8%, after one week immersion, 5.3% after two week immersion; and
Example 7: 5.0%
[b] The molded product blend of Example 7 contains about 11% glass fiber based on the combined weight of the polyester and the MBS polymer components of the blend.

EXAMPLE 6

The procedure of Example 5 is repeated substantially as described except that the blend of polyester and MBS polymer additive is prepared from a mixture of 600 parts of the polyester and 75 parts of the MBS polymer additive corresponding to about 11% of the MBS polymer additive based on the combined weight of resins in the blend. The results of this Example are also compared with the results of the preceeding Example in Table I below.

EXAMPLE 7

A glass fiber filled blend of a linear aromatic polyester and MBS polymer additive is prepared employing 240 parts of the linear aromatic polyester of Example 1, 30 parts of the MBS polymer additive of Example 3 (corresponding to 11% of this additive based on the resin components of the blend) and 30 parts of a proprietary chopped glass fiber (3/16 inch length) reinforcement filler containing a proprietary silane coupling agent, said proprietary glass filler being manufactured under the designation 419AA by the Owens Corning Fiberglass Company. The preparatory procedure employed in this Example is substantially that of the foregoing Examples with the exception that the initially obtained injection molded filled product is ground, dried and remolded in the injection molding apparatus to insure homogeneous distribution of the glass fiber filler in the product. There is obtained an excellent filled blend in accordance with the invention. The results of this Example are also tabulated in Table I below.

Comparison of the product tensile strengths of the pure molded polyester in Control Examples 1 and 2 prior to and subsequent to immersion in boiling water with the corresponding product tensile strengths in the Examples describing blends of the MBS polymer additive and the corresponding polyester indicate the enhancement in hydrolytic stability achieved by blending the polyester with the MBS polymer according to the invention.

For example, the percentage loss in tensile strength of the polyester of Control Example 2 is about 16% on one week immersion in boiling water and is about 80% on two weeks immersion in boiling water. In unexpected contrast to these results, the products of Examples 5 and 6 containing respectively about 25 weight percent and about 11 weight percent of MBS polymer additive blended with said polyester exhibit no loss in tensile strength on one week immersion or even on two week immersion in boiling neutral water.

EXAMPLE 8 (Control

A bisphenol-A—isophthalate—terephthalate polyester is prepared by a semi-continuous transesterification procedure as follows:

Mixtures of a 75/25 diphenyl isophthalate/diphenyl terephthalate mixture and bisphenol-A were vacuum oven-dried for about 3 hours at 2 mm Hg in large flat trays then weighted into polyethylene-lined 5-gallon pails and sealed until used.

The proportions used of the bisphenol and diaryl ester mixture are initially 16.25 kg (3.7 moles) and 16.33 moles (5.2 moles), respectively, providing a mole percent excess of the diaryl ester reactant over the bisphenol of about 0.5%. Later in the reaction, the proportions of the reactants are adjusted to provide a mole percent excess of the diaryl ester of about 0.75 mole percent over the bisphenol and still later, the proportions of reactants are adjusted to provide diaryl ester in a mole percent excess of about 1.0% over the bisphenol.

The diphenyl isophthalate, diphenyl terephthalate, and bisphenol-A are charged to a stainless steel melt tank and melted at about 180° C. under a blanket of dry nitrogen. The molten monomer mixture is transferred via heated lines to a continuously stirred oil heated reactor. Catalyst (potassium phenoxide, 0.041 molar solution in phenol, 0.0081 moles, i.e. 0.05 mole percent based on bisphenol-A) is added. Vacuum is applied and the temperature (which is initially 220°) is raised gradually. After about 2.5 hours, the pressure is about 70 mm and the temperature is 280° C. Intrinsic viscosity of the polyester prepolymer at this point is about 0.17 dl/g.

The prepolymer is transferred via heated lines to a second stirred reactor and another prepolymer is prepared similarly to the first stirred reactor.

The prepolymer from the second stirred reactor is fed continuously at about 20-25 lbs/hour to a vertical wiped thin film reactor which is maintained at an internal temperature of 300° C. and a pressure of 1.50 mm Hg (abs.). The reaction mass fed to the top of the wiped thin film reactor flows down through the reactor propelled by gravity and by the downward thrust of the pitched rotor blades. These blades also agitate and renew the polymer on the heated reaction surface of the thin film reactor. The material leaving the thin film reactor has an intrinsic viscosity of about 0.4 dl/g.

The polymer is pumped out from the bottom of the wiped thin film reactor and fed to a 5-stage twin screw horizontal extruder having five vacuum vents (one from each stage). The extruder is operated at about 0.8 mm Hg (abs.) pressure, and a screw speed of 125 rpm. The pressure is maintained uniformly throughout the barrel, i.e. through the extruder. The temperature of the melt in the different stages of the extruder is maintained between about 320° and about 340°, the former temperature being the melt temperature at the feed end of the extruder and the latter temperature being the melt temperature at the outlet end of the extruder. The aforementioned melt temperature profile within the extruder is controlled by maintaining the following three temperature zones on the outside of the extruder barrel Zone 1 (near the feed end of the extruder): 305°; Zone 2 (near the mid-section of the extruder); 310° and Zone 3 (near the outlet end of the extruder): 315°. Under these operating conditions, light yellow, clear, tough polymer is produced at a rate of 20 lbs/hour. The product has an intrinsic viscosity of about 0.60 dl/g.

The polyester made by the foregoing melt transesterification polymerization preparatory procedure, after being dried for about 16 hours is compacted by extrusion from a Haake extruder operating under the following conditions:

| | TEMPERATURE OF | | | | | | |
|---|---|---|---|---|---|---|---|
| RPM | Zone 1 | Zone 2 | Zone 3 | Zone 4 | Die Melt | Torque | Amp. |
| 50 | 360° | 360° | 340° | 340° | 350° | 11,000 | 40 |

The compacted extruded polyester strands are chopped into pellets which are dried and injected molded into sample specimens suitable for evaluation of properties, e.g. tensile properties, on an Arburg Injection Molding Apparatus Model 220, operating under the following conditions:

| Cylinder Temperature | 600° F. |
|---|---|
| Mold Temperature | 250° F. |
| Molding Pressure | 14,430 psi |

The tensile strength of the molded polyester is measured and this data is presented with the foregoing injection molding conditions in Table II below. Additional specimens of the injection molded polyester are immersed in a bath of boiling water of substantially neutral pH for one and two weeks. After being raised from the bath, these specimens were tested for tensile strength. This data is also presented in Table II below.

EXAMPLE 9

A physical mixture of 89 parts of the dry linear aromatic polyester of Example 8 and 11 parts of a proprietary acrylonitrile modified MBS polymer of Example 3 are compacted, injection molded and tested for properties substantially as described in Example 8 above. The injection molding conditions and the properties of the resulting polyester-MBS polymer blend which contains about 11% of the MBS polymer based on the combined weight of the polyester, and the MBS polymer are presented in Table II below.

EXAMPLE 10

The procedure of Example 9 is repeated substantially as described above in preparing and injection molding a blend of the polyester of Example 8 and the MBS polymer of Example 3 employing 75 parts of the polyester and 25 parts of the MBS polymer (corresponding to about 25% of the MBS polymer based on the combined weight of the polyester and MBS polymer components in the blend). The blend of this Example is tested for properties substantially as described in Example 8 and these results are presented with injection molding operating conditions in Table II below.

EXAMPLE 11

The procedure of Example 9 is repeated substantially as described except that in place of the proprietary MBS polymer additive of Example 3, there is employed the MBS polymer of Example 5. The results of this Example are also presented in Table II below.

EXAMPLE 12

The procedure of Example 11 is repeated substantially as described except that the blend of polyester and MBS polymer additive is prepared from a mixture of 75 parts of the polyester and 25 parts of the MBS polymer additive corresponding to about 25% of the MBS polymer additive based on the combined weight of the polyester and the MBS polymer in the blend. The results of this Example are compared with the results of the preceeding Examples 8-11 in Table II below.

TABLE II

|  | Example 8 (Control) | Example 9 | Example 10 | Example 11 | Example 12 |
| --- | --- | --- | --- | --- | --- |
| Bisphenol Polyester (%) | 100% | 89% | 75% | 89% | 75% |
| MBS Polymer Additive (%) | — | MBS Polymer of Ex. 3 (11%) | MBS Polymer of Ex. 3 (25%) | MBS Polymer of Ex. 5 (11%) | MBS Polymer of Ex. 5 (25%) |
| *Injection Molding Conditions* | | | | | |
| Cylinder Temperature (°F.) | 600° | 570° | 570° | 570° | 560° |
| Mold Temperature (°F.) | 250° | 250° | 250° | 250° | 250° |
| Injection Pressure, psi | 14,430 | 11,100 | 9,990 | 16,650 | 15,540 |
| *Tensile Properties Prior to Immersion* | | | | | |
| Tensile Strength, psi | 10,166 | 4,503 | 5,842 | 8,543 | 6,807 |
| *After One (1) Week Immersion in Boiling Water* | | | | | |
| Tensile Strength, psi | 427 | 691 | 1,710 | 5,440 | 7,184 |
| *After Two (2) Weeks Immersion in Boiling Water* | | | | | |
| Tensile Strength, psi | 203 | 444 | 792 | 1,654 | 5,374 |

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. A thermoplastic polymeric composition comprising, in admixture, (a) a linear aromatic polyester of monomer components consisting essentially of a bisphenol and a dicarboxylic acid, and (b) an MBS polymer prepared by graft polymerization of methyl methacrylate, or mixture thereof with a minor proportion of an ethylenically unsaturated comonomer, copolymerizable with said methacrylate monomer, in the presence of a polybutadiene or a butadienestyrene trunk copolymer rubber or by blending a methyl methacrylate/styrene copolymer with polybutadiene or a copolymer of butadiene.

2. The composition of claim 1 wherein said dicarboxylic acid has the formula:

$$HO-\overset{O}{\overset{\|}{C}}-(Z)_n-\overset{O}{\overset{\|}{C}}-OH$$

wherein Z is alkylene, —Ar— or —Ar—Y—Ar— where Ar is aromatic, Y is alkylene, haloalkylene, $$-O-, -S-, -SO_2-, -SO_3-, -CO-, G\overset{|}{P}=O \text{ or } GN\diagup\diagdown ;$$

wherein G is alkyl, haloalkyl, aryl, haloaryl, alkylaryl, haloalkylaryl, arylalkyl, haloarylalkyl, cycloalkyl or cyclohaloalkyl; and n is 0 or 1.

3. The composition of claim 2 wherein said dicarboxylic acid is an aromatic dicarboxylic acid.

4. The composition of claim 3 wherein said aromatic dicarboxylic acid is selected from the group consisting of isophthalic acid, terephthalic acid, and mixtures thereof.

5. The composition of claim 1 wherein said bisphenol has the formula:

$$\underset{T_b \quad G_m \quad T_{b'}}{HO-Ar-(E)_x-Ar-OH}$$

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene; arylene, or haloarylene, $$-O-, -S-, -SO-, -SO_2-, -SO_3-,$$

$$-CO-, G\overset{|}{P}=O \text{ or } GN\diagup\diagdown ;$$

T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1.

6. The composition of claim 5 wherein the bisphenol is bisphenol A.

7. The composition of claim 3 wherein the polyester is a transesterification-prepared polyester.

8. The composition of claim 7 wherein the polyester is prepared by transesterification reaction of the bisphenol and a di-ester of the dicarboxylic acid and a monohydroxy phenolic compound of the benzene or naphthalene series of 6 to 20 carbon atoms.

9. The composition of claim 1 wherein said MBS polymer is essentially the only polymeric additive to the polyester.

10. The composition of claim 1 wherein the MBS polymer consists essentially of methyl methacrylate 1,3-butadiene and styrene monomer components.

11. The composition of claim 1 wherein the MBS polymer also contains an acrylonitrile monomer component.

12. The composition of claim 1 wherein the MBS polymer is present in an amount of from about 1 to 99 parts by weight per 100 parts by weight of the mixture of the polyester and the MBS polymer.

13. The composition of claim 12 wherein the MBS polymer is present in a minor weight proportion based on the combined weight of the polyester and the MBS polymer.

14. The composition of claim 13 wherein the MBS polymer is present in an amount of from about 5 to about 30 parts per 100 parts by weight of the mixture.

15. The composition of claim 1 which also includes a filler material.

16. The composition of claim 15 wherein said filler material is particulate glass.

17. The composition of claim 16 wherein the filler material is glass fiber present in an amount of about 5 to about 70 weight percent based on the combined weight of the polyester and the MBS polymer.

18. The composition of claim 17 wherein the glass fiber contains or organic coupling agent.

19. The composition of claim 18 wherein said organic coupling agent is a silane.

20. A thermoplastic polymeric composition comprising, in admixture, (a) a linear aromatic polyester prepared by transesterification of monomer reactants consisting essentially of a bisphenol and a diphenyl ester of an aromatic dicarboxylic acid, and (b) and MBS polymer prepared by graft polymerization of methyl methacrylate, or mixture thereof with a minor proportion of an ethylenically unsaturated comonomer, copolymerizable with said methacrylate monomer, in the presence of a polybutadiene or a butadienestyrene trunk copolymer rubber or by blending a methyl methacrylate/styrene copolymer with polybutadiene or a copolymer of butadiene.

21. A process for improving the hydrolytic stability of a linear aromatic polyester resin of component monomers consisting essentially of a bisphenol and a dicarboxylic acid which comprises adding from about 1 to about 99 parts by weight of an MBS polymer per 100 parts by weight of the resin mixture to said polyester, said MBS polymer being prepared by graft polymerization of methyl methacrylate, or mixture thereof with a minor proportion of an ethylenically unsaturated comonomer, copolymerizable with said methacrylate monomer, in the presence of a polybutadiene or a butadienestyrene trunk copolymer rubber or by blending a methyl methacrylate/styrene copolymer with polybutadiene or a copolymer of butadiene.

22. A molded article formed from the composition of claim 1.

23. A molded article formed from the composition of claim 15.

24. A molded article formed from the composition of claim 18.

25. A molded article formed from the composition of claim 20.

* * * * *